United States Patent
Shiu et al.

(10) Patent No.: US 8,629,630 B2
(45) Date of Patent: Jan. 14, 2014

(54) LED DRIVING CIRCUIT AND CONTROL CIRCUIT

(75) Inventors: Shian-Sung Shiu, New Taipei (TW);
Chung-Che Yu, New Taipei (TW);
Li-Min Lee, New Taipei (TW)

(73) Assignee: Green Solution Technology Co., Ltd., New Taipei (TW)

( * ) Notice: Subject to any disclaimer, the term of this patent is extended or adjusted under 35 U.S.C. 154(b) by 265 days.

(21) Appl. No.: 13/086,365

(22) Filed: Apr. 13, 2011

(65) Prior Publication Data

US 2011/0291575 A1    Dec. 1, 2011

(30) Foreign Application Priority Data

May 25, 2010  (TW) .............................. 99116575 A

(51) Int. Cl.
*G05F 1/00* (2006.01)
*H05B 37/02* (2006.01)
*H05B 39/04* (2006.01)
*H05B 41/36* (2006.01)

(52) U.S. Cl.
USPC ............. 315/307; 315/291; 315/301; 363/74; 363/149; 323/284; 323/293

(58) Field of Classification Search
USPC ......... 315/291, 307, 301; 363/74, 149, 21.01, 363/21.06, 16; 323/284, 293
See application file for complete search history.

(56) References Cited

U.S. PATENT DOCUMENTS

| 7,106,130 B2* | 9/2006 | Gan et al. ......................... 330/10 |
| 7,457,140 B2* | 11/2008 | Klein ............................. 363/132 |
| 2009/0033307 A1* | 2/2009 | Park et al. ...................... 323/293 |
| 2010/0321956 A1* | 12/2010 | Yeh ................................. 363/16 |
| 2011/0095731 A1* | 4/2011 | Zhao et al. ..................... 323/205 |
| 2011/0215780 A1* | 9/2011 | Lee et al. ....................... 323/282 |
| 2012/0176048 A1* | 7/2012 | Li et al. ......................... 315/186 |

FOREIGN PATENT DOCUMENTS

| CN | 1997250 | 7/2007 |
| CN | 101335488 | 12/2008 |
| CN | 101425752 | 5/2009 |
| CN | 101662871 | 3/2010 |

OTHER PUBLICATIONS

"First Office Action of China counterpart application" issued on Jun. 25, 2013, p. 1-p. 7.

* cited by examiner

*Primary Examiner* — Shawki Ismail
*Assistant Examiner* — Dylan White
(74) *Attorney, Agent, or Firm* — Jianq Chyun IP Office

(57) ABSTRACT

A control circuit adapted to control a power converting circuit for stabilizing an output of the power converting circuit is provided. The control circuit includes a capacitor, a charging unit, a discharging unit, a feedback control unit, and a duty-cycle adjusting unit. The charging unit has a first current source coupled to the capacitor for charging the capacitor. The discharging unit is coupled to the capacitor for discharging the capacitor. The feedback control unit controls the charging unit to charge the capacitor according to a feedback signal which represents the output of the power converting circuit. The duty-cycle adjusting unit generates a control signal and adjusts a duty cycle of the control signal according to a voltage of the capacitor.

18 Claims, 2 Drawing Sheets

LED DRIVING CIRCUIT AND CONTROL CIRCUIT

CROSS-REFERENCE TO RELATED APPLICATION

This application claims the priority benefit of Taiwan application serial no. 99116575, filed May 25, 2010. The entirety of the above-mentioned patent application is hereby incorporated by reference herein and made a part of this specification.

BACKGROUND OF THE INVENTION

1. Field of the Invention

The invention relates to an LED driving circuit and a control circuit.

2. Description of Related Art

At present, the electric energy accounts for 14% of the global energy each year, which is the maximum, and in the usage of the electric energy, the ratio of illumination is up to 22%. Accordingly, with a global trend of energy-saving and carbon reduction, the illumination plays a significant role in the current stage.

Currently, main illumination sources are generally incandescent bulbs and fluorescent lamps. Incandescent bulbs have the low cost, but they can not satisfy the global trend of energy-saving and carbon reduction in the current stage due to the disadvantages of high power consumption, low illumination efficiency, and high thermal pollution. Fluorescent lamps are fabricated by glass and have plug openings in the two ends. Accordingly, fluorescent lamps can be connected with the power supply and fixed. Unlike incandescent bulbs, ballasts are required to be installed in fluorescent lamps and co-operates with starters to generate a high transient voltage which ionizes the gas to make fluorescent lamps lighting. The advantages of fluorescent lamps are the low cost and high illumination efficiency. However, fluorescent lamps also have some problems in the usage, such as flickering and pre-heating. The flickering frequency of fluorescent lamps is related to the driving voltage. The flickering of fluorescent lamp is not easy to be sensed by human eyes. However, the flickering may generate fan effect in some environments, which limits and affects the application in the environments. The pre-heating of fluorescent lamp may change the brightness in the initial lighting and after being used for a time period. Due to light emitting diodes (LEDs) having advantages of long lifespan, high illumination efficiency, stable brightness, LEDs become a mainstream product of next generation for lighting and illuminating.

The application of LEDs is fairly extensive, for example, indoor illumination, outdoor illumination, advertisement boards, back light module of electronic products, and so forth. In the foregoing application, the problems of the LEDs, such as high cost and heat dissipation are rapidly improved, and the overall permeability will rapidly increase in the future. With the LEDs gradually replacing current illumination sources, how to suitably drive the LEDs serving as illumination sources and provide suitable protection has now become one of the most important tasks. Accordingly, the LEDs can bring their capability into full play and the safety can also be enhanced in the usage.

SUMMARY OF THE INVENTION

In order to control LEDs to provide stable light-emitting corresponding to different driving method, in an exemplary embodiment of the invention, the LEDs are controlled to provide stable light-emitting in manners of current feedback and voltage feedback. Furthermore, in order to avoid the LED driving circuit encountering any problem in use, an exemplary embodiment of the invention also provides a protecting function to avoid the circuit being burnt when the problem which sufficiently affects the normal operation of the circuit occurs.

Accordingly, an embodiment of the invention provides a control circuit adapted to control a power converting circuit for stabilizing an output of the power converting circuit. The control circuit includes a capacitor, a charging unit, a discharging unit, a feedback control unit, and a duty-cycle adjusting unit. The charging unit has a first current source coupled to the capacitor for charging the capacitor. The discharging unit is coupled to the capacitor for discharging the capacitor. The feedback control unit controls the charging unit to charge the capacitor according to a feedback signal which represents the output of the power converting circuit. The duty-cycle adjusting unit generates a control signal and adjusts a duty cycle of the control signal according to a voltage of the capacitor.

An embodiment of the invention also provides an LED driving circuit adapted to drive an LED module. The LED module has a plurality of LED strings, and the LED strings are coupled in parallel. The LED driving circuit includes a current balancing module, a first extreme voltage detecting circuit, a power converting circuit, and a control circuit. The control circuit generates the control signal according to a feedback signal and includes a capacitor, a charging unit, a discharging unit, a feedback control unit, and a duty-cycle adjusting unit. The current balancing module has a plurality of current balancing end correspondingly coupled to the LED strings and balancing currents of the LED strings. The first extreme voltage detecting circuit is coupled to the current balancing ends and generates a feedback signal according to the highest voltage level or the lowest voltage level among voltage levels of the current balancing ends. The power converting circuit is coupled to an input power source and converts an electric power of the input power source according to a control signal so as to drive the LED module to emit light. The charging unit has a first current source coupled to the capacitor for charging the capacitor. The discharging unit is coupled to the capacitor for discharging the capacitor. The feedback control unit controls the charging unit to charge the capacitor according to the feedback signal. The duty-cycle adjusting unit generates a control signal and adjusts a duty cycle of the control signal according to a voltage of the capacitor.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
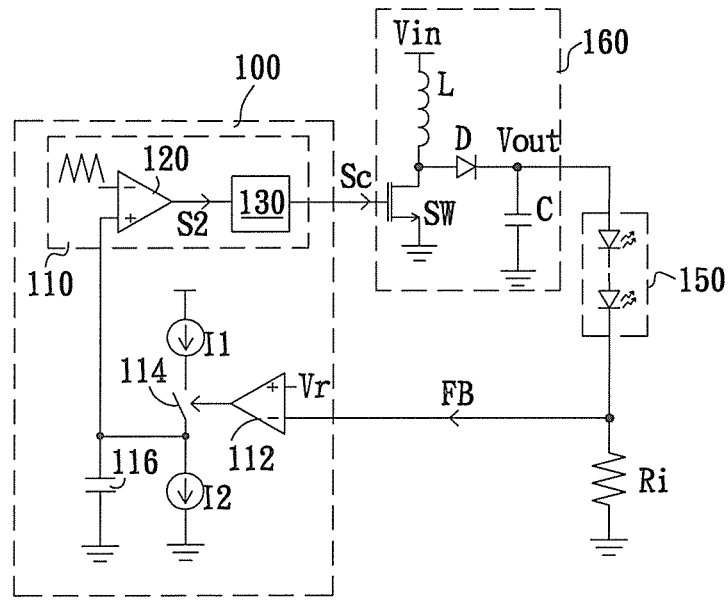
FIG. 1 is a schematic view of an LED driving circuit according to a first embodiment of the invention.

FIG. 1 is a schematic view of an LED driving circuit according to a first embodiment of the invention. Referring to FIG. 1, the LED driving circuit includes a control circuit 100 and a power converting circuit 160 for driving an LED module 150. The LED module 150 has a string of LEDs which are coupled in series. The power converting circuit 160 is coupled to an input power source Vin and converts an electric power of the input power source Vin, e.g. boosting or bucking, according to a control signal Sc, so as to output an output voltage Vout to drive the LED module 150 to emit light. In the present embodiment, the power converting circuit 160 is a boost DC/DC converting circuit including an inductor L, a transistor switch SW, a rectifying diode D, and an output capacitor C. One end of the inductor L is coupled to the input power source Vin, the other end of the inductor L is coupled to one end of the transistor switch SW, and the other end of the transistor switch SW is grounded. One end of the output capacitor C is coupled to the connection point of the inductor L and the transistor switch SW through the rectifying diode D, and the other end of the output capacitor C is grounded. A feedback resistor Ri is coupled to the LED module 150 to generate a feedback signal FB. The control circuit 100 receives the feedback signal FB and obtains the information about the power consumption of the LED module 150 according to the feedback signal FB which represents an output state of the power converting circuit 160. Accordingly, the control circuit 100 generates the control signal Sc such that the LED module 150 stably emits light. The control circuit 100 includes a duty-cycle adjusting unit 110, a feedback control unit 112, a charging unit, a discharging unit, and a capacitor 116. The charging unit has a first current source I1 and a first switch 114. The first current source I1 is coupled to the capacitor 116 through the first switch 114 to provide a charging current for charging the capacitor 116. The discharging unit has a second current source I2 coupled to the capacitor 116 to provide a discharging current for discharging the capacitor 116. In the present embodiment, the feedback control unit 112 is a comparator of which the non-inverting end receives a reference voltage signal Vr, and the inverting end receives the feedback signal FB. Accordingly, the feedback control unit 112 controls the first switch 114 to be conducted or cut off. The duty-cycle adjusting unit 110 includes a PWM modulator 120 and a driving circuit 130. The PWM modulator 120 may be a comparator of which the inverting end receives a ramp signal, and the non-inverting end is coupled to the capacitor 116. Accordingly, the PWM modulator 120 generates a PWM modulating signal S2 to the driving circuit 130. The driving circuit 130 generates the control signal Sc to control the transistor switch in the power converting circuit 160 to be conducted or cut off according to the PWM modulating signal S2, so as to adjust the output current value of the power converting circuit 160. When the current flowing through the LED module 150 is lower that a predetermined current value, the level of the feedback signal FB generated by the current flowing through the feedback resistor Ri is lower than that of the reference voltage signal Vr, and the feedback control unit 112 generates a high level signal to turn on the first switch 114. At this time, the first current source I1 charges the capacitor 116 through the first switch 114, and the second current source I2 simultaneously discharges the capacitor 116. In the present embodiment, the current value of the charging current provided by the first current source I1 is larger than that of the discharging current provided by the second current source I2. Accordingly, when the first switch 114 is conducted, the voltage of the capacitor 116 is raised up. As the voltage of the capacitor 116 is raised up, the duty cycle of the PWM modulating signal S2 outputted by the PWM modulator 120 is increased. Accordingly, the output current of the power converting circuit 160 is increased, and further, the current flowing through the LED module 150 is also increased. When the current flowing through the LED module 150 is higher than the predetermined current value, the level of the feedback signal FB generated by the current flowing through the feedback resistor Ri is higher than that of the reference voltage signal Vr, and the feedback control unit 112 generates a low level signal to turn off the first switch 114. At this time, the first current source I1 stops charging the capacitor 116, and the second current source I2 continuously discharges the capacitor 116, such that the voltage of the capacitor 116 gradually falls down. As the voltage of the capacitor 116 falls down, the duty cycle of the PWM modulating signal S2 outputted by the PWM modulator 120 is decreased. Accordingly, the output current of the power converting circuit 160 is gradually decreased, and further, the current flowing through the LED module 150 is also gradually decreased. When the current flowing through the LED module 150 is lower than the predetermined current value again, the control circuit repeats the foregoing steps. Accordingly, the current of the LED module 150 is stabilized near the predetermined current value, and thus, the LED module 150 stably emits light.

Figure 2:
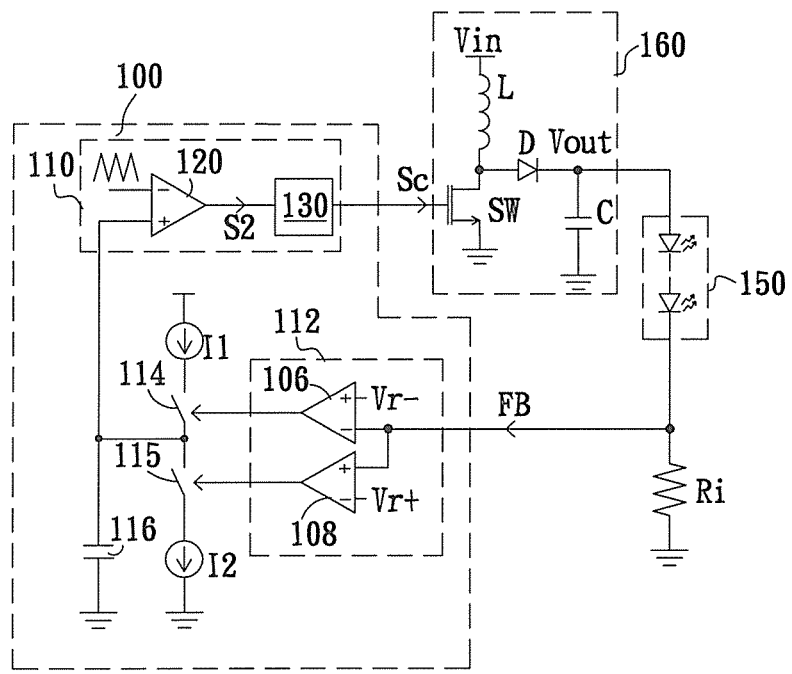
FIG. 2 is a schematic view of an LED driving circuit according to a second embodiment of the invention.

FIG. 2 is a schematic view of an LED driving circuit according to a second embodiment of the invention. Referring to FIG. 2, compared the control circuit of the present embodiment with that of the embodiment shown in FIG. 1, the main difference there between lies in that, the control method of the control circuit 100 for charging and discharging the capacitor 116, and the illustration is described as follows. The control circuit 100 includes a duty-cycle adjusting unit 110, a feedback control unit 112, a charging unit, a discharging unit, and a capacitor 116. The charging unit has a first current source I1 and a first switch 114. The first current source I1 is coupled to the capacitor 116 through the first switch 114 to provide a charging current for charging the capacitor 116. The discharging unit has a second current source I2 and a second switch 115. The second current source I2 is coupled to the capacitor 116 through the second switch 115 to provide a discharging current for discharging the capacitor 116. The feedback control unit 112 includes a first comparator 106 and a second comparator 108. The inverting end of the first comparator 106 receives the feedback signal FB generated by the feedback resistor Ri, and the non-inverting end of the first comparator 106 receives a first reference voltage signal Vr−. The non-inverting end of the second comparator 108 receives the feedback signal FB generated by the feedback resistor Ri, and the inverting end of the second comparator 108 receives a second reference voltage signal Vr+. Herein, the level of second reference voltage signal Vr+ is higher than that of the first reference voltage signal Vr−, and the level of the feedback signal FB represents the power consumption of the LED module 150.

When the level of the feedback signal FB is lower than that of the first reference voltage signal Vr−, the first comparator 106 outputs a high level signal to turn on the first switch 114, and the second comparator 108 outputs a low level signal to turn off the second switch 115. At this time, the voltage of the capacitor 116 is raised up due to the charge of the charging unit, such that the duty cycle of the PWM modulating signal S2 of the PWM modulator 120 is increased. When the level of the feedback signal FB is higher than that of the second reference voltage signal Vr+, the first comparator 106 outputs a low level signal to turn off the first switch 114, and the second comparator 108 outputs a high level signal to turn on the second switch 115. At this time, the voltage of the capacitor 116 falls down due to the discharge of the discharging unit, such that the duty cycle of the PWM modulating signal S2 of the PWM modulator 120 is decreased. When the level of the feedback signal FB is between those of the first reference voltage signal Vr− and the second reference voltage signal Vr+, the first comparator 106 and the second comparator 108 both output the low level signals such that the voltage of the capacitor 116 is constant. As the foregoing description, the level of the feedback signal FB is controlled within a predetermined range to stabilize the power consumption of the LED module 150, i.e. the output current of the power converting circuit 160.

In exemplary embodiments of the invention, besides the boost DC/DC converting circuit in the foregoing embodiment, other converting circuits having the function of outputting DC voltages may be implemented as the power converting circuit, such as the buck DC/DC converting circuit, a flyback converting circuit, a forward converting circuit and so on. In the following, a flyback converting circuit is exemplary.

Figure 3:
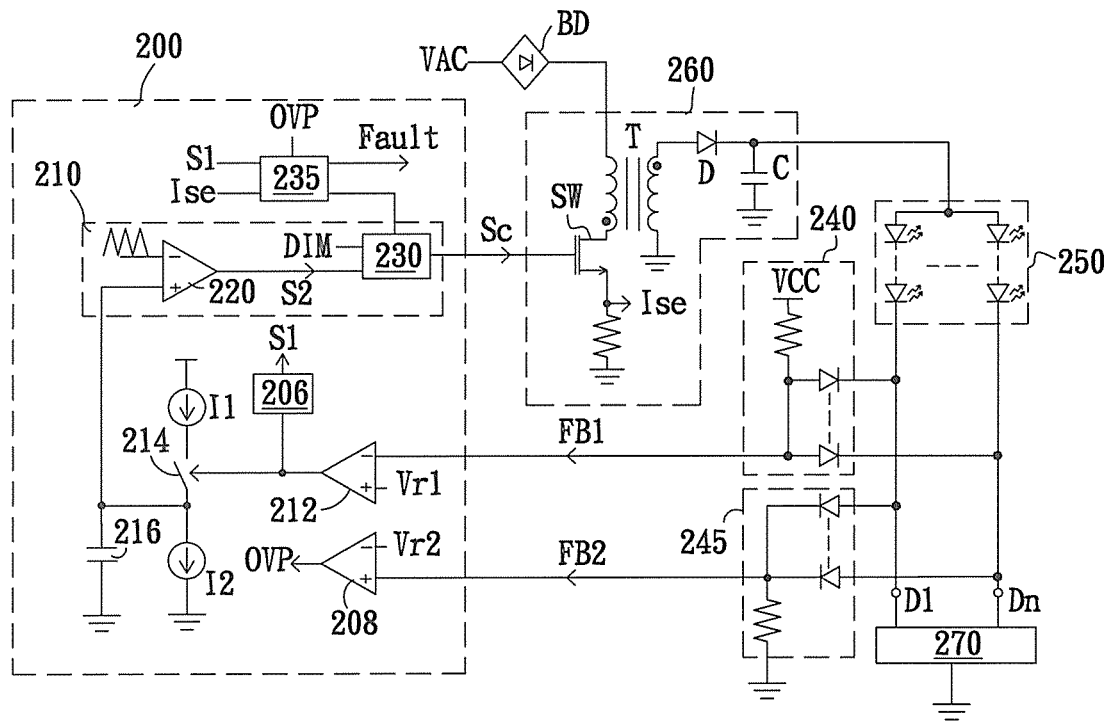
FIG. 3 is a schematic view of an LED driving circuit according to a third embodiment of the invention.

FIG. 3 is a schematic view of an LED driving circuit according to a third embodiment of the invention. Referring to FIG. 3, the LED driving circuit includes a controller 200 and a power converting circuit 260 for driving an LED module 250. The LED module 250 has a plurality of LED strings, and these LED strings are coupled in parallel. The power converting circuit 260 is coupled to an AC input power source VAC through a bridge rectifier BD and converts an electric power of the AC input power source VAC according to a control signal Sc so as to drive the LED module 250 to emit light. In the present embodiment, the power converting circuit 260 is a flyback converting circuit including a transformer T, a transistor switch SW, a rectifying diode D, and an output capacitor C. One end of the primary side of the transformer T is coupled to the AC input power source VAC, the other end of the primary side of the transformer T is coupled to one end of the transistor switch SW, and the other end of the transistor switch SW is grounded through a current detecting resistor. One end of the output capacitor C is coupled to the secondary side of the transformer T through the rectifying diode D, and the other end of the output capacitor C is grounded.

In order to ensure that any LED in the LED module 250 substantially has the same current, a current balancing module 270 may be added into the LED driving circuit. The current balancing module 270 has a plurality of current balancing ends D1 to Dn which are correspondingly coupled to the LED strings one by one in the LED module 250. The current balancing module 270 balances currents of the LED strings, such that the currents of each LED string are stabilized at a predetermined current value. Since the driving voltages for each LED string having the predetermined current value are different, the voltage value of the current balancing ends D1 to Dn are different. In order to control the current balancing ends D1 to Dn of the current balancing module 270 to normally operate, i.e., the flowing currents can be controlled at a predetermined current value, maintaining the levels of the current balancing ends D1 to Dn at a lowest operable voltage value is necessary. Accordingly, in the present embodiment, a first extreme voltage detecting circuit 240 is added and coupled to the current balancing ends D1 to Dn, and the first extreme voltage detecting circuit 240 generates a first feedback signal FB1 according to a lowest voltage level among voltage levels of the current balancing ends D1 to Dn. The first extreme voltage detecting circuit 240 may include a plurality of diodes of which negative ends are respectively and correspondingly coupled to the current balancing ends D1 to Dn, and positive ends are coupled to each other and coupled to a driving power source VCC through a resistor. Accordingly, besides the diode corresponding to the current balancing end having the lowest voltage level is forward conducted, the other diodes can not be conducted due to insufficient voltage drops, such that the level of the first feedback signal FB1 is the lowest voltage level of the current balancing end added with the forward bias of the diode.

The control circuit 200 includes a duty-cycle adjusting unit 210, a feedback control unit 212, a charging unit, a discharging unit, and a capacitor 216. The charging unit has a first current source I1 and a first switch 214. The first current source I1 is coupled to the capacitor 216 through the first switch 214 to provide a charging current for charging the capacitor 216. The discharging unit has a second current source I2 coupled to the capacitor 216 to provide a discharging current for discharging the capacitor 216. The feedback control unit 212 may be a comparator of which the non-inverting end receives a first reference voltage signal Vr1, and the inverting end receives the first feedback signal FB1. Accordingly, the feedback control unit 212 controls the first switch 214 to be conducted or cut off. The duty-cycle adjusting unit 210 includes a PWM modulator 220 and a driving circuit 230 and adjusts a duty cycle of the control signal Sc according to a voltage of the capacitor 216. The PWM modulator 220 may be a comparator of which the inverting end receives a ramp signal, and the non-inverting end is coupled to the capacitor 216. Accordingly, the PWM modulator 220 generates a PWM modulating signal S2 to the driving circuit 230. The driving circuit 230 generates the control signal Sc to control the power converting circuit 260 according to the PWM modulating signal, such that the lowest one among the voltage levels of the current balancing ends D1 to Dn is maintained at a predetermined voltage value. The lower the set value of the predetermined voltage is, the higher the light-emitting efficiency of the LED module 250 is driven by the power converting circuit 260.

Since the current balancing module 270 has a limitation of endurable voltage, when any voltage level of the current balancing ends D1 to Dn is higher than the endurable value, the current balancing module 270 is accordingly burnt. For example, when any LED string of the LED module 250 is open, the control circuit 200 continuously pulls up the output voltage of the power converting circuit 260 to try to increase the voltage level of the corresponding current balancing end to the predetermined voltage value. At this time, the voltage levels of the current balancing ends of the other LED strings may be over high. Alternatively, when parts of LEDs in a specific LED string are short, the voltage drop of the short LED string is lowered, such that the voltage level of the current balancing end corresponding to the LED string may be over high. Accordingly, a second extreme voltage detecting circuit 245 is added and coupled to the current balancing ends D1 to Dn, and the second extreme voltage detecting circuit 245 generates a second feedback signal FB2 according to a highest voltage level among the voltage levels of the current balancing ends D1 to Dn. The second extreme voltage detecting circuit 245 may include a plurality of diodes of which positive ends are respectively and correspondingly coupled to the current balancing ends D1 to Dn, and negative ends are coupled to each other and grounded through a resistor. The control circuit 200 further includes an over-voltage comparator 208 of which the non-inverting end receives the second feedback signal FB2, and the inverting end receives a second reference voltage signal Vr2. When the level of the second feedback signal FB2 is higher than that of the second reference voltage signal Vr2, the over-voltage comparator 208 outputs an over-voltage protecting signal OVP.

Furthermore, when the circuit normally operates, the voltage levels of the current balancing ends D1 to Dn can be maintained at or above the predetermined voltage value. When any voltage level of the current balancing ends D1 to Dn is lower than the predetermined voltage value and can not be raised to the predetermined voltage value, it represents the circuit is abnormal. However, when the circuit is initially started or during the dimming process, the voltage levels of the current balancing ends D1 to Dn are temporally lower than the predetermined voltage value. In order to avoid erroneous determination and exclude the foregoing abnormal condition, a timer 206 may be added into the control circuit 200 and coupled to the feedback control unit 212. When the level of the first feedback signal FB1 is lower than that of the first reference voltage signal Vr1 for a predetermined time period, i.e. the feedback control unit 212 continuously outputs high level signals for the predetermined time period, the timer 206 outputs an under-voltage protection S1. Certainly, the timer 206 may further receive a start signal or a dimming signal and determines the time point to start counting according to the start signal or the dimming signal, wherein the start signal is a signal representing that the circuit is started. Since the power supply capability of the power converting circuit is different according to the design of the circuit, the necessary duration of the predetermined time period is also different. In order to meet all kinds of circuit design, if the control circuit of the exemplary embodiment is a single integral circuit, a set pin can be added, and through an external resistor or capacitor (not shown), the foregoing predetermined time period is set.

The control circuit further includes a protecting circuit 235 coupled to the timer 206, the over-voltage comparator 208, and the driving circuit 230. After receiving any of the over-voltage protecting signal OVP and the under-voltage protection S1, the protecting circuit 235 controls the driving circuit 230 to stop generating the control signal Sc, so as to achieve the protecting function. Furthermore, the protecting circuit 235 further receives a current detecting signal Ise generated by the current detecting resistor. When the current detecting signal Ise is at the low level for a predetermined time, it represents that the circuit at the input end of the power converting circuit 260 is open, and then, the protecting circuit 235 also controls the driving circuit 230 to stop generating the control signal Sc. Alternatively, when the current detecting signal Ise is higher than an over-current value, it represents that the circuit at the input end of the power converting circuit 260 is short. At this time, the protecting circuit 235 outputs a fault signal Fault to inform the previous-stage circuit to stop supplying power to the LED driving circuit to avoid more elements being burnt due to short.

Figure 4:
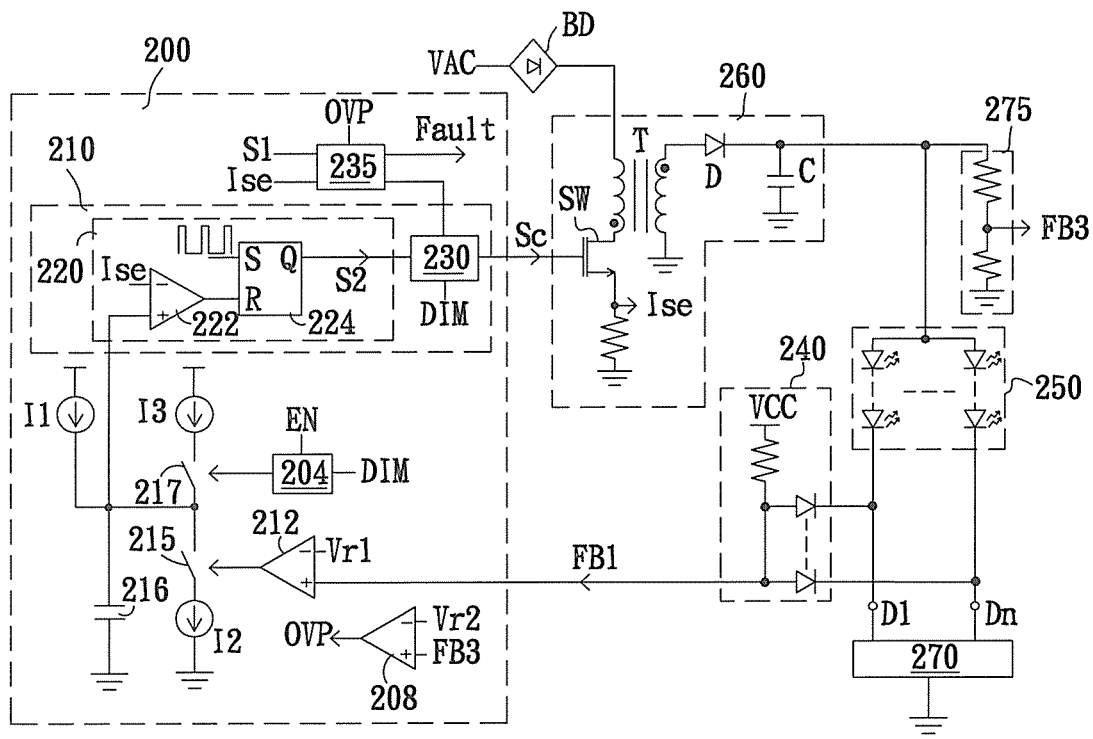
FIG. 4 is a schematic view of an LED driving circuit according to a fourth embodiment of the invention.

FIG. 4 is a schematic view of an LED driving circuit according to a fourth embodiment of the invention. Referring to FIG. 4, compared the control circuit of the present embodiment with that of the embodiment shown in FIG. 3, the main difference there between lies in that, the control mode of the control circuit 200 is changed from a voltage control mode to a current control mode, and the control method for charging and discharging the capacitor 216 is also changed. The illustration is described as follows.

The control circuit 200 includes a duty-cycle adjusting unit 210, a feedback control unit 212, a charging unit, a discharging unit, and a capacitor 216. The charging unit has a first current source I1, a third current source I3, and a third switch 217. The first current source I1 is coupled to the capacitor 216 to provide a basic charging current for charging the capacitor 216, and the third current source I3 is coupled to the capacitor 216 through the third switch 217 to provide a charging current for charging the capacitor 216. The discharging unit has a second current source I2 and a second switch 215. The second current source I2 is coupled to the capacitor 216 through the second switch 215 to provide a discharging current for discharging the capacitor 216. Herein, the current value of the first current source I1 is smaller than the current values of the second current source I2 and the third current source I3. The feedback control unit 212 may be a comparator of which the inverting end receives a first reference voltage signal Vr1, and the non-inverting end receives the first feedback signal FB1. Accordingly, the feedback control unit 212 controls the second switch 215 to be conducted or cut off. When the level of the first feedback signal FB1 is lower than that of the first reference voltage signal Vr1, the feedback control unit 212 outputs a low level signal to cut off the second switch 215. At this time, the first current source I1 charges the capacitor 216 to increase the voltage of the capacitor 216. When the level of the first feedback signal FB1 is higher than that of the first reference voltage signal Vr1, the feedback control unit 212 outputs a high level signal to turn on the second switch 215. Accordingly, the second current source I2 discharges the capacitor 216, and the first current source I1 simultaneously charges the capacitor 216. Since the current value of the first current source I1 is smaller than that of the second current source I2, the voltage of the capacitor 216 decreases at this time. The duty-cycle adjusting unit 210 includes a PWM modulator 220 and a driving circuit 230. The PWM modulator 220 includes a comparator 222 and a SR flip flop 224. The non-inverting end of the comparator 222 is coupled to the capacitor 216, and the inverting end of the comparator 222 receives the current detecting signal Ise. The set end S of the SR flip flop 224 receives a clock signal, and the reset end R of the SR flip flop 224 is coupled to the comparator 222. When the set end S of the SR flip flop 224 receives the clock signal, a PWM signal S2 is generated from the output end Q to the driving circuit 230. The driving circuit 230 receives the PWM signal S2 and a dimming signal DIM and accordingly generates a control signal Sc to turn on the transistor switch SW of the power converting circuit 260. When the current flowing through the primary side of the transformer T increases, and accordingly the level of the current detecting signal Ise is higher than the voltage level of the capacitor 216, the comparator 222 outputs a high level signal such that the SR flip flop 224 is reset. At this time, the driving circuit 230 stops generating the control signal Sc, and the transistor switch SW of the power converting circuit 260 is cut off. Accordingly, the energy stored in the transformer T is transmitted to the secondary side of the power converting circuit 260 to provide electric power for driving the LED module 250 to emit light.

In order to increase the transient response speed of the control circuit 200, the voltage of the capacitor 216 can be rapidly raised up when the circuit is initially started or during the dimming process. The control circuit 200 controls the third switch 217 through a transient increasing circuit 204. The transient increasing circuit 204 receives an enable signal EN and a dimming signal DIM. When receiving the enable signal EN, and the dimming signal DIM changes from "OFF" state to "ON" state, the transient increasing circuit 204 outputs a high level signal to turn on the third switch 217. At this time, the first current source I1 and the third current source I3 simultaneously charge the capacitor 216, such that the voltage of the capacitor 216 rapidly increases. The transient increasing circuit 204 may be set to cut off the third switch 217 after a predetermined time period or according to the first feedback signal FB1. That is, the third switch 217 is conducted for a constant time period and cut off after that. Alternatively, when the lowest level among the voltage levels of the current balancing ends D1 to Dn reaches to a predetermined level, the third switch 217 is cut off.

Furthermore, in the present embodiment, the non-inverting end of the over-voltage comparator 208 receives a third feedback signal FB3 instead of the second feedback signal FB2 of the embodiment shown in FIG. 3. The third feedback signal FB3 is generated by detecting the output voltage of the power converting circuit 260 through a voltage detecting circuit 275. When the output voltage of the power converting circuit 260 is higher than a predetermined protecting value, the level of the third feedback signal FB3 is higher than that of second reference voltage signal Vr2. At this time, the over-voltage comparator 208 accordingly outputs the over-voltage protecting signal OVP such that the protecting circuit 235 controls the driving circuit 230 to stop outputting the control signal Sc.

As the above description, the invention completely complies with the patentability requirements: novelty, non-obviousness, and utility. It will be apparent to those skilled in the art that various modifications and variations can be made to the structure of the invention without departing from the scope or spirit of the invention. In view of the foregoing descriptions, it is intended that the invention covers modifications and variations of this invention if they fall within the scope of the following claims and their equivalents.

What is claimed is:

1. A control circuit, adapted to control a power converting circuit for stabilizing an output of the power converting circuit, the control circuit comprising:
   a capacitor;
   a charging unit having a first current source coupled to the capacitor for charging the capacitor;
   a discharging unit coupled to the capacitor for discharging the capacitor;
   a feedback control unit controlling the charging unit to charge the capacitor according to a feedback signal representing the output of the converting circuit;
   a duty-cycle adjusting unit generating a control signal, and adjusting a duty cycle of the control signal according to a voltage of the capacitor,
   wherein the charging unit has a first switch coupled between the first current source and the capacitor, the feedback control unit has a comparator, and the comparator controls the first switch to be conducted or cut off according to the feedback signal and a reference voltage signal; and
   a protecting unit, generating a protecting signal to have the duty-cycle adjusting unit to stop outputting the control signal when a level of the feedback signal is lower than a first protecting value, or the level of the feedback signal is lower than the first protecting value for a predetermined time period.

2. The control circuit as claimed in claim 1, wherein the protecting unit is further configured for generating the protecting signal to have the duty-cycle adjusting unit to stop outputting the control signal when the level of the feedback signal is higher than a second protecting value, or an output voltage of the power converting circuit is higher than a third protecting value.

3. The control circuit as claimed in claim 1, wherein the discharging unit has a second switch and a second current source, the second switch is coupled between the second current source and the capacitor, the feedback control unit controls the first switch and the second switch to be conducted or cut off according to the feedback signal.

4. The control circuit as claimed in claim 3, wherein the protecting unit is further configured for generating the protecting signal to have the duty-cycle adjusting unit to stop outputting the control signal when the level of the feedback signal is higher than a second protecting value, or an output voltage of the power converting circuit is higher than a third protecting value.

5. The control circuit as claimed in claim 1, wherein the charging unit has a third switch and a third current source, the third switch is coupled between the third current source and the capacitor, the discharging unit has a second switch and a second current source, the second switch is coupled between the second current source and the capacitor, the feedback control unit controls the third switch and the second switch to be conducted or cut off according to the feedback signal, wherein a current value of the third current source is larger than a current value of the first current source.

6. The control circuit as claimed in claim 5, wherein the protecting unit is further configured for generating the protecting signal to have the duty-cycle adjusting unit to stop outputting the control signal when the level of the feedback signal is higher than a second protecting value, or an output voltage of the power converting circuit is higher than a third protecting value.

7. A control circuit, adapted to control a power converting circuit for stabilizing an output of the power converting circuit, the control circuit comprising:
   a capacitor;
   a charging unit having a first current source coupled to the capacitor for charging the capacitor;
   a discharging unit coupled to the capacitor for discharging the capacitor;
   a feedback control unit controlling the charging unit to charge the capacitor according to a feedback signal representing the output of the converting circuit;
   a duty-cycle adjusting unit generating a control signal, and adjusting a duty cycle of the control signal according to a voltage of the capacitor,
   wherein the charging unit has a first switch coupled between the first current source and the capacitor, the feedback control unit has a comparator, and the comparator controls the first switch to be conducted or cut off according to the feedback signal and a reference voltage signal; and
   a protecting unit, generating a protecting signal to have the duty-cycle adjusting unit to stop outputting the control signal when a level of the feedback signal is higher than a second protecting value, or an output voltage of the power converting circuit is higher than a third protecting value.

8. The control circuit as claimed in claim 7, wherein the protecting unit is further configured for generating the protecting signal to have the duty-cycle adjusting unit to stop outputting the control signal when the level of the feedback signal is lower than a first protecting value, or the level of the feedback signal is lower than the first protecting value for a predetermined time period.

9. The control circuit as claimed in claim 7, wherein the charging unit has a first switch coupled between the first current source and the capacitor, the discharging unit has a second switch and a second current source, the second switch is coupled between the second current source and the capacitor, the feedback control unit controls the first switch and the second switch to be conducted or cut off according to the feedback signal.

10. The control circuit as claimed in claim 9, wherein the protecting unit is further configured for generating the protecting signal to have the duty-cycle adjusting unit to stop outputting the control signal when the level of the feedback signal is lower than a first protecting value, or the level of the feedback signal is lower than the first protecting value for a predetermined time period.

11. The control circuit as claimed in claim 7, wherein the charging unit has a third switch and a third current source, the third switch is coupled between the third current source and the capacitor, the discharging unit has a second switch and a second current source, the second switch is coupled between the second current source and the capacitor, the feedback control unit controls the third switch and the second switch to be conducted or cut off according to the feedback signal, wherein a current value of the third current source is larger than a current value of the first current source.

12. The control circuit as claimed in claim 11, wherein the protecting unit is further configured for generating the protecting signal to have the duty-cycle adjusting unit to stop outputting the control signal when the level of the feedback signal is lower than a first protecting value, or the level of the feedback signal is lower than the first protecting value for a predetermined time period.

13. A control circuit, adapted to control a power converting circuit for stabilizing an output of the power converting circuit, the control circuit comprising:
   a capacitor;
   a charging unit having a first current source coupled to the capacitor for charging the capacitor;
   a discharging unit coupled to the capacitor for discharging the capacitor;
   a feedback control unit controlling the charging unit to charge the capacitor according to a feedback signal representing the output of the converting circuit;
   a duty-cycle adjusting unit generating a control signal, and adjusting a duty cycle of the control signal according to a voltage of the capacitor,
   wherein the charging unit has a first switch coupled between the first current source and the capacitor, the discharging unit has a second switch and a second current source, the second switch is coupled between the second current source and the capacitor, the feedback control unit controls the first switch and the second switch to be conducted or cut off according to the feedback signal; and
   a protecting unit, generating a protecting signal to have the duty-cycle adjusting unit to stop outputting the control signal when a level of the feedback signal is lower than a first protecting value, or the level of the feedback signal is lower than the first protecting value for a predetermined time period, or the level of the feedback signal is higher than a second protecting value, or an output voltage of the power converting circuit is higher than a third protecting value.

14. The control circuit as claimed in claim 13, wherein the feedback control unit has a comparator, and the comparator controls the first switch to be conducted or cut off according to the feedback signal and a reference voltage signal.

15. The control circuit as claimed in claim 13, wherein the charging unit has a third switch and a third current source, the third switch is coupled between the third current source and the capacitor, the feedback control unit controls the third switch and the second switch to be conducted or cut off according to the feedback signal, wherein a current value of the third current source is larger than a current value of the first current source.

16. A control circuit, adapted to control a power converting circuit for stabilizing an output of the power converting circuit, the control circuit comprising:
   a capacitor;
   a charging unit having a first current source coupled to the capacitor for charging the capacitor;
   a discharging unit coupled to the capacitor for discharging the capacitor;
   a feedback control unit controlling the charging unit to charge the capacitor according to a feedback signal representing the output of the converting circuit;
   a duty-cycle adjusting unit generating a control signal, and adjusting a duty cycle of the control signal according to a voltage of the capacitor,
   wherein the discharging unit has a first switch and a second current source, the charging unit has a second switch and a third current source, the first switch is coupled between the second current source and the capacitor, the second switch is coupled between the third current source and the capacitor, the feedback control unit controls the second switch and the first switch to be conducted or cut off according to the feedback signal, wherein a current value of the third current source is larger than a current value of the first current source; and
   a protecting unit, generating a protecting signal to have the duty-cycle adjusting unit to stop outputting the control signal when a level of the feedback signal is lower than a first protecting value, or the level of the feedback signal is lower than the first protecting value for a predetermined time period, or the level of the feedback signal is higher than a second protecting value, or an output voltage of the power converting circuit is higher than a third protecting value.

17. The control circuit as claimed in claim 16, wherein the charging unit has a third switch coupled between the first current source and the capacitor, the feedback control unit has a comparator, and the comparator controls the third switch to be conducted or cut off according to the feedback signal and a reference voltage signal.

18. The control circuit as claimed in claim 16, wherein the charging unit has a third switch coupled between the first current source and the capacitor, the feedback control unit controls the third switch and the second switch to be conducted or cut off according to the feedback signal.

* * * * *